Aug. 22, 1939.  E. C. COUSART  2,170,783
BRICK CLEANING MACHINE
Filed June 21, 1938  3 Sheets-Sheet 1

Inventor
E. C. Cousart

By Clarence A. O'Brien
and Hyman Berman
Attorneys

Aug. 22, 1939.     E. C. COUSART     2,170,783
BRICK CLEANING MACHINE
Filed June 21, 1938     3 Sheets-Sheet 2
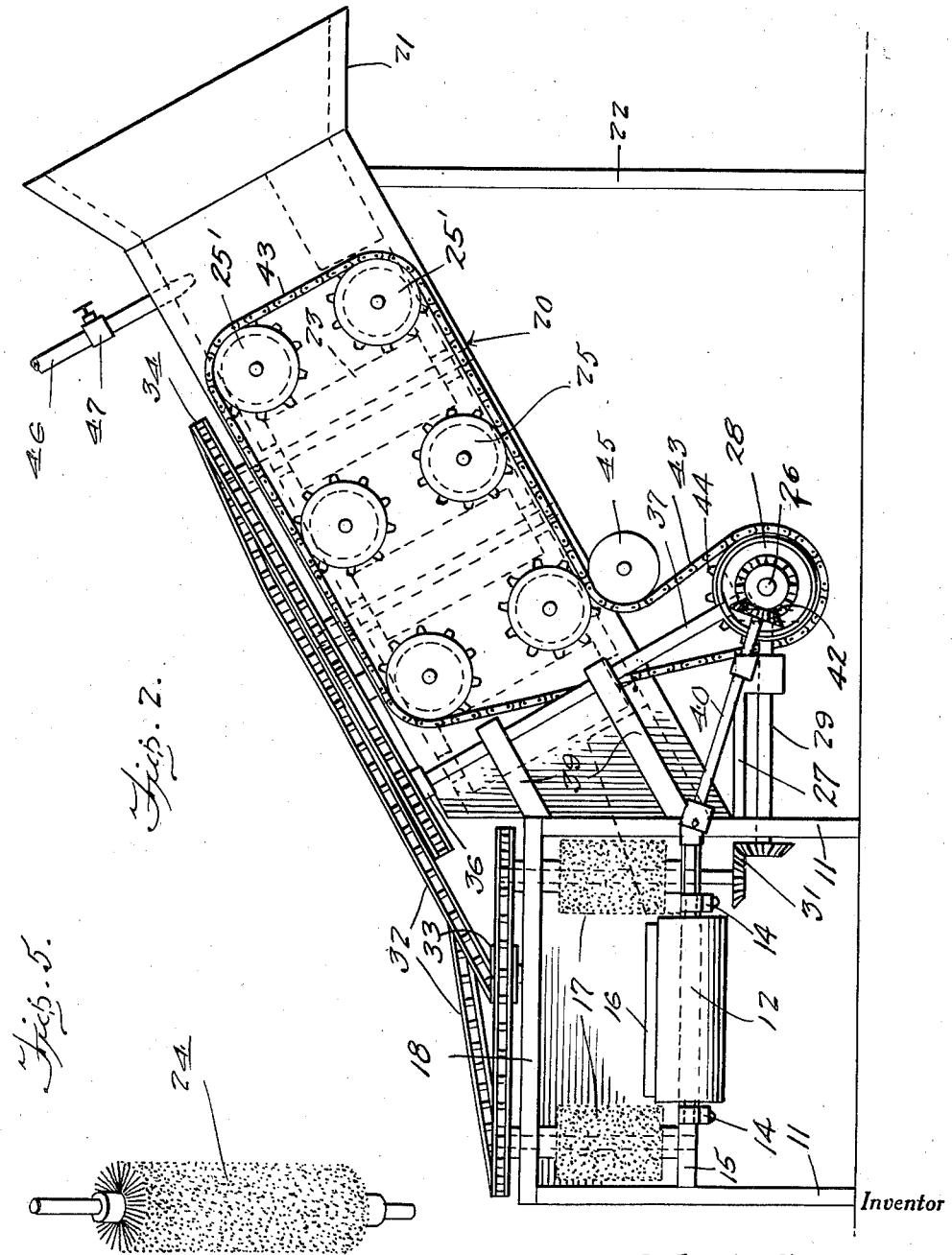
Inventor
E. C. Cousart
By Clarence A. O'Brien
and Hyman Berman
Attorneys

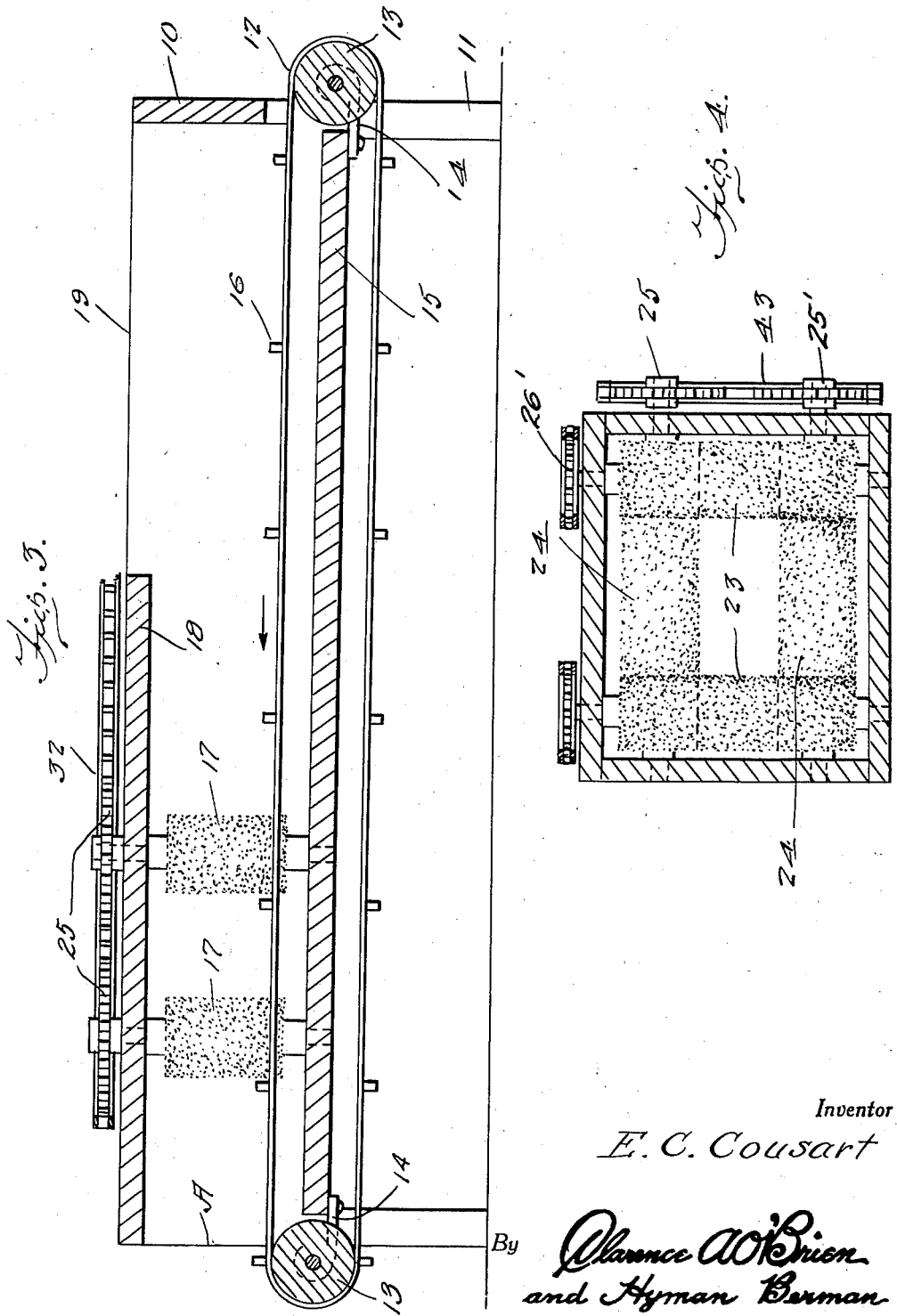

Patented Aug. 22, 1939

2,170,783

UNITED STATES PATENT OFFICE 2,170,783

BRICK CLEANING MACHINE

Eddie C. Cousart, Danville, Va., assignor of forty per cent to Clyde A. Luck and thirty per cent to C. S. Cowan and N. T. Williams, all of Danville, Va.

Application June 21, 1938, Serial No. 215,020

3 Claims. (Cl. 125—26)

This invention relates to brick cleaning machines, and has for the primary object the provision of a device of this character which will rapidly and efficiently clean all faces of bricks of mortar and foreign matter as the bricks are passed through the device one after the other, means being provided for wetting the bricks as they start through the device so that the rotating brushes of said device may efficiently clean foreign matter from the bricks.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a brick cleaning machine constructed in accordance with my invention.

Figure 2 is a side elevation illustrating the machine.

Figure 3 is a sectional view taken on the line 3—3 of Figure 1.

Figure 4 is a sectional view taken on the line 4—4 of Figure 1.

Figure 5 is a perspective view illustrating one of the brushes.

Figure 1:
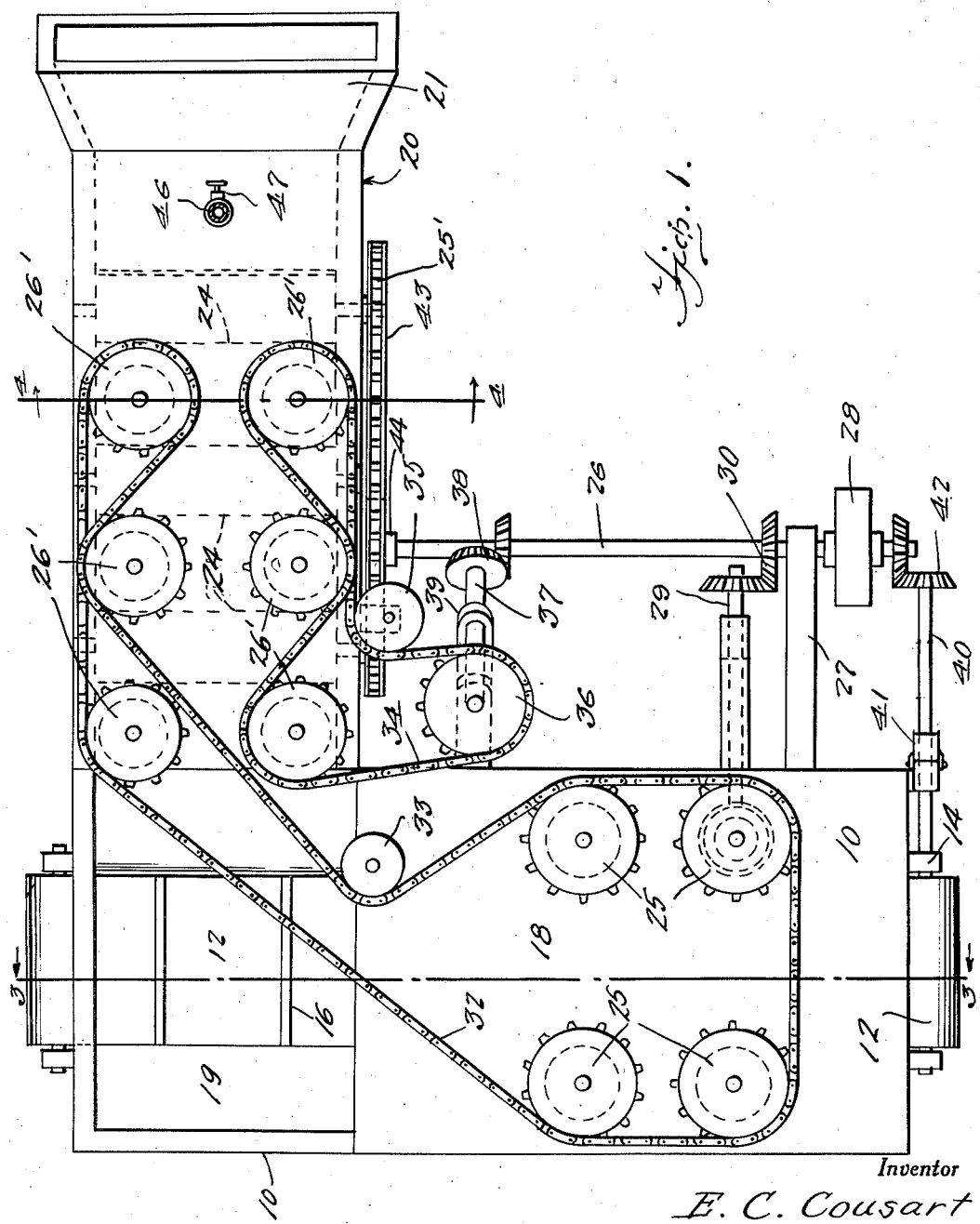

Referring in detail to the drawings, the numeral 10 indicates a horizontally arranged trough supported by legs 11. Operating in the trough 10 is an endless conveyor 12 journaled over drums 13 located at opposite ends of the trough. The journals of the drums are indicated by the numeral 14. The upper run of the endless conveyor travels above the bottom wall 15 of the trough while the lower run passes under said bottom wall. The conveyor travels in the direction indicated by the arrow in Figure 3 and the runs of the conveyor have secured thereon flights 16 spaced a selected distance apart for the purpose of permitting bricks to be received between the flights of the upper run. The distance between the flights is approximately the width of the bricks. Bricks are received in the trough 10 at the right end thereof upon the upper run of the conveyor and the conveyor operating in the direction indicated by the arrow carries said bricks and discharges them from the end A of the trough.

Pairs of vertically arranged rotatable brushes 17 are journaled in the trough 10 at opposite sides of the upper run of the conveyor so that as the bricks are moved endwise of the trough the brushes engage with the ends of the bricks and clean the end faces of said bricks of any foreign matter adhering thereto. The top of the trough 10 is partly closed by a top wall 18 leaving a portion of the trough open, as shown at 19, to receive the discharge end of an upwardly inclined chute 20. The upper end of the chute 20 is flared, as shown at 21, to facilitate the passing of bricks into the chute for movement down said chute into the trough 10 upon the upper run of the endless conveyor.

Suitable legs 22 are provided for supporting the upper end of the chute. Pairs of rotatable brushes 23 are vertically arranged in the chute between which the bricks pass on their movement towards the lower end of the chute so that the side faces of the bricks will be cleaned of foreign matter. Also, journaled in the chute 20 are pairs of horizontally arranged rotatable brushes 24 adapted to contact the top and bottom faces of the bricks as they pass downwardly through the chute. Thus it will be seen that as the bricks pass through the chute 20 all faces of the bricks will be cleaned of foreign mater except the end faces or walls of the bricks which are cleaned by the brushes 17 when the bricks are conveyed endwise of the trough 10.

The brushes are suitably journaled in the walls of the chute and the trough 10 and the brushes of the trough 10 have secured thereto sprocket gears 25 while the brushes 24 of the chute have secured thereto sprocket gears 25' and the brushes 23 have secured thereto sprocket gears 26'. The rotatable brushes preferably are constructed with metallic bristles so as to be durable and efficient in cleaning foreign matter from the faces or walls of the bricks.

A driven shaft 26 is journaled on brackets 27 carried by the trough 10 and is equipped with a pulley 28 to receive a power belt of a power source (not shown). The trough 10 also rotatably supports a shaft 29 connected to the driven shaft 26 by gears 30 and is geared to one of the brushes of the trough 10, as shown at 31. The sprocket gears 25 of the brushes 17 have trained thereover an endless sprocket chain 32 which also is trained over the sprocket gears 26' of certain of the vertically arranged brushes 23 of the chute, as clearly shown in Figure 1. The sprocket chain 32 also passes over an idler pulley 33 journaled on the trough.

It will be noted by referring to Figure 1 that the runs of the sprocket chain 32 pass over the sprocket gears of the vertically arranged brushes at one side of the chute in such a way that the intermediate brush is caused to rotate in an opposite direction to the end brushes. The sprocket gears 26' of the other vertically arranged brushes 23 of the chute have trained thereover a sprocket chain 34 which has one run passing over an idler pulley 35 and also is trained over a sprocket gear 36 secured on a shaft 37 geared to the driven shaft 26, as shown at 38. The shaft 37 is rotatably supported by a bracket 39 carried by the trough 10. The runs of the sprocket chain 34 are so trained over the sprocket gears 26' of the latter-named vertically arranged brushes of the chute that the intermediate brush will rotate in an opposite direction to the end brushes. Therefore, it will be seen that the intermediately arranged vertical brushes of the chute rotate in the same direction with each other and in an opposite direction to the other vertically arranged brushes and in a direction opposite to the movement of the bricks through the chute. The end vertically arranged brushes in the chute rotate in a direction tending to feed the bricks from the receiving end of the chute towards the discharge end.

A shaft 40 including a universal joint 41 is connected to one of the drums 13 of the endless conveyor and is connected by gears 42 to the driven shaft 26 so that the endless conveyor will be caused to travel in the trough for the purpose of conveying bricks received therein from the chute to the discharge end A of the trough.

The horizontally arranged brushes 24 of the chute or the sprocket gears 25' thereof have trained thereover an endless sprocket chain 43 which also is trained over a gear 44 secured on the driven shaft 26, thereby bringing about rotation of the horizontally arranged brushes in the chute. One run of the sprocket chain 43 is guided by an idler pulley 45 journaled on the chute.

A water discharge nozzle 46 having a control valve 47 enters the upper portion of the chute for the purpose of spraying water onto the bricks as they move downwardly in the chute so as to soften the foreign matter on the bricks.

Bricks may be fed rapidly through the machine and as they travel through the chute and trough the brushes thoroughly and efficiently clean all faces or walls of the bricks of any foreign matter that may be adhered thereto. Through the use of this machine a large number of bricks may be thoroughly cleaned within a comparatively short length of time.

It is believed that the foregoing description, when taken in connection with the drawings will fully set forth the construction and advantages of this invention to those skilled in the art to which such a device relates, so that further detailed description will not be required.

Having thus described my invention, what I claim is:

1. A brick cleaning machine comprising a horizontally arranged trough, an inclined chute connecting with said trough at one end thereof for receiving and discharging into the trough bricks, an endless conveyor operating in the trough to receive the bricks from the chute and convey said bricks to one end of the trough for disbursement, rotatable cleaning brushes operating in the chute to clean certain faces of the bricks of foreign matter as said bricks pass through the chute by gravity with certain of the brushes acting to force the bricks downwardly through the chute, rotatable brushes operating in the trough for cleaning the other faces of the bricks as they are moved endwise of the trough by the conveyor, and means for rotating the brushes and driving the conveyor.

2. A brick cleaning machine comprising a horizontally arranged trough, an inclined chute connecting with said trough at one end thereof for receiving and discharging into the trough bricks, an endless conveyor operating in the trough to receive the bricks from the chute and convey said bricks to one end of the trough for disbursement, rotatable cleaning brushes operating in the chute to clean certain faces of the bricks of foreign matter as said bricks pass through the chute, rotatable brushes operating in the trough for cleaning the other faces of the bricks as they are moved endwise of the trough by the conveyor, and means for rotating the brushes of the chute and trough with all brushes of the chute rotating in one direction except a pair of the brushes and the latter rotating in an opposite direction, and means for rotating the brushes of the trough in the same direction.

3. A brick cleaning machine comprising a horizontally arranged trough, an endless conveyor operating in said trough for moving bricks from one end of the trough to and through the other end of said trough, a downwardly inclined chute connecting with the trough for delivering bricks onto the conveyor and having its uppermost end flared to form a mouth to receive bricks, rotatable brushes arranged horizontally and vertically of the chute between which the bricks pass on their way to the trough, vertically arranged brushes operating in the trough to be engaged by the bricks moved by said conveyor, means for discharging water in the upper portion of the chute for moistening the bricks prior to engaging the brushes therein, a driven shaft journaled on the trough, and drive means between the driven shaft and the conveyor and the brushes and said driven shaft.

EDDIE C. COUSART.